March 20, 1973     A. I. GEYSER     3,721,053

ADJUSTABLE JOINT BETWEEN PANEL FRAMES

Filed March 1, 1971     3 Sheets-Sheet 1

INVENTOR.
ALBERT I. GEYSER
BY Brown, Murray, Flick & Peckham
ATTORNEYS.

INVENTOR.
ALBERT I. GEYSER
BY
Brown, Murray, Flick & Peckham
ATTORNEYS.

March 20, 1973 A. I. GEYSER 3,721,053
ADJUSTABLE JOINT BETWEEN PANEL FRAMES
Filed March 1, 1971 3 Sheets-Sheet 3

INVENTOR.
ALBERT I. GEYSER
BY Brown, Murray, Flick & Peckham
ATTORNEYS.

United States Patent Office 3,721,053
Patented Mar. 20, 1973

3,721,053
ADJUSTABLE JOINT BETWEEN PANEL FRAMES
Albert I. Geyser, Pittsburgh, Pa., assignor to
E. K. Geyser Company, Pittsburgh, Pa.
Filed Mar. 1, 1971, Ser. No. 122,593
Int. Cl. E04b 7/18
U.S. Cl. 52—82
6 Claims

ABSTRACT OF THE DISCLOSURE

Each of a pair of frames has a side member with an outwardly opening channel provided with parallel side flanges having transversely arcuate inner surfaces extending length-wise thereof. These side members are disposed in spaced parallel relation. A joint member extends length-wise of each channel and is rotatably mounted therein, while a rigid connecting strip extends along each joint member and is joined to it. The strips project laterally between the joint members in overlapping relation to close the space between the frames. The connecting strips are held against lateral movement across each other. By rotating at least one of the frames on the joint member therein, the angle between the two frames can be changed.

---

There are many places where panels are used in construction work, and many ways for joining such panels together. However, the joint design usually requires a given pair of panels to always be disposed in a unique relation to each other. This practice is restrictive, requiring special design and fabrication for each paired relationship and joint intersection. It would be desirable to be able to let the joint design be independent of the angle of panel intersection, and also to be able to change that angle or re-use the panels at different angles and configurations of vertices.

It is among the objects of this invention to provide panel framing in which panels can be connected by the same means at different angles to each other, and which can have their relative positions shifted when desired after they have been connected.

The invention is illustrated in the accompanying drawings, in which

Figure 4:
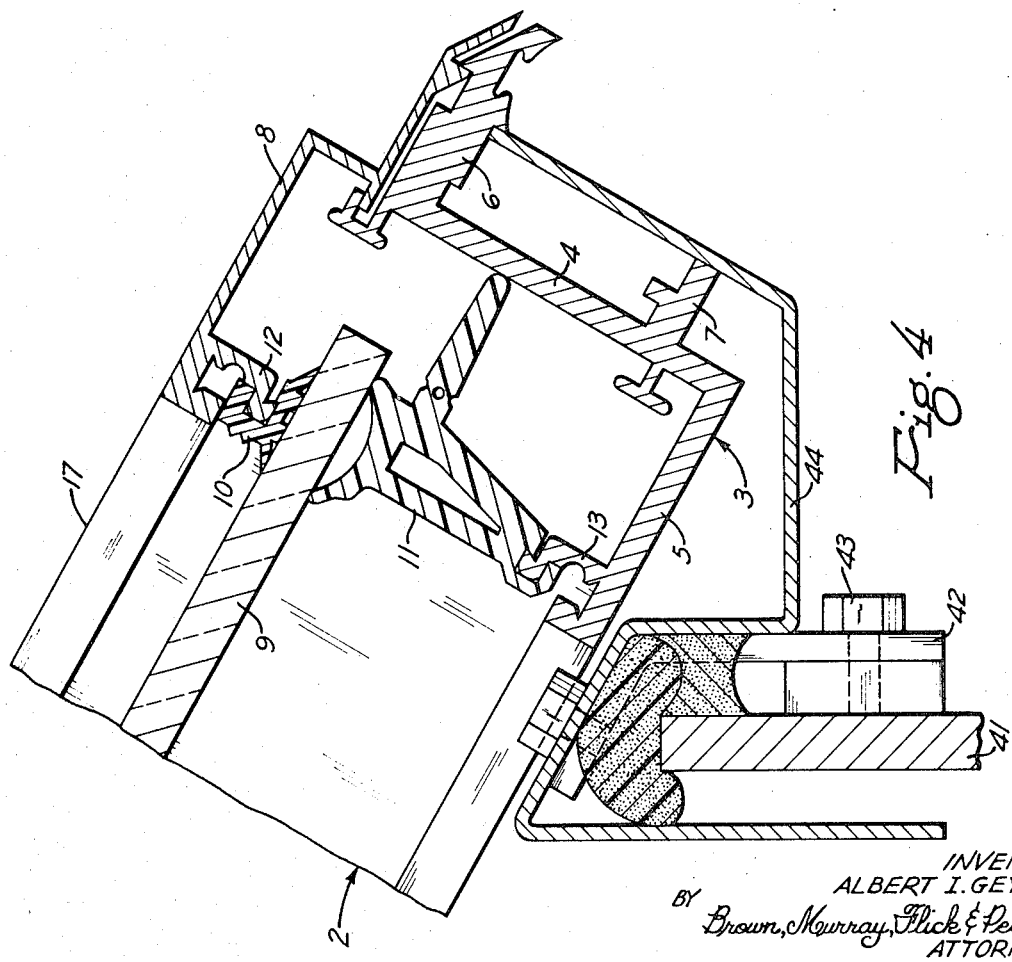
FIG. 4 is an enlarged vertical cross section taken on the line IV—IV of FIG. 2.

Referring to the drawings, the invention is shown embodied in a skylight, but it is just as applicable to other structures, such as outside walls and interior partitions. The skylight illustrated is formed from four triangular panel frames 1 arranged to form the four sides of a pyramid. That is, they are disposed side by side and inclined upwardly toward one another to the apex of the pyramid. Each triangular frame is formed from three side members, preferably aluminum extrusions. The two inclined side members 2 are identical, but the third member 3 that connects them at the bottom is different in one respect. As shown in FIG. 4, it has an outer side wall 4 and an inwardly projecting bottom wall 5. From the top of the outer wall a flange 6 extends laterally outward, and near the bottom there is an outwardly projecting rib 7. A facing strip 8 fits onto the flange and extends inwardly over the bottom wall. Between the latter and the facing strip the lower marginal area of a panel 9 is located. It is held in place by rubber-like upper and lower sealing strips 10 and 11 hooked onto interior ribs 12 and 13, respectively, and compressed against the top and bottom of the panel. The panel may be a glass pane or a metal, wood or composition panel. Of course, it is triangular like the frame in which it is mounted.

Figure 3:
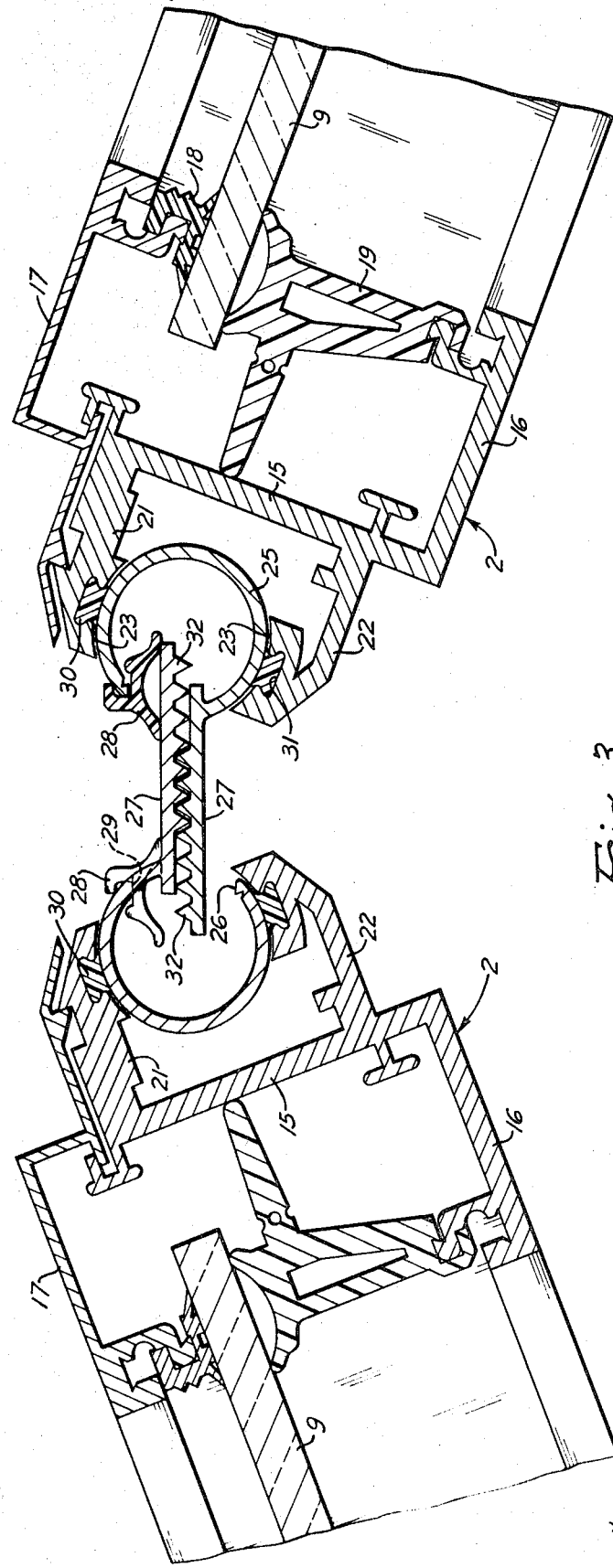
FIG. 3 is an enlarged fragmentary cross section taken on the line III—III of FIG. 1.

Each of the inclined side members 2 of a frame, as shown in FIG. 3, likewise has an outer side wall 15 and an inwardly extending bottom wall 16, as well as a facing strip 17 and sealing strips 18 and 19 for the panel 9. However, there not only is an outwardly projecting upper flange 21, but also a lower flange 22 in place of rib 7 of the lower member 3, whereby an outwardly opening channel is formed having side flanges 21 and 22. These flanges have opposed transversely arcuate inner surfaces 23 forming segments of an imaginary cylinder extending lengthwise between the flanges from end to end. The channels of adjacent frames are spaced apart a short distance as shown, but they are connected and the space between them is closed in the following manner.

Extending lengthwise in each channel is a joint member 25 that engages the two arcuate surfaces 23. This member can be turned on its axis, with its outer surface sliding against the flanges. Preferably, the joint member is cylindrical. Also, it is desirable to make it hollow with a relatively thin side wall, and provide it with a slot or gap 26 extending from end to end. The upper ends of the two joint members in each frame are cut at the same angle as the two side members 2 of the frame, but are spaced slightly so that they will not interfere with each other when they are turned in the frame. To install the joint member in a channel, the outer edge of a channel flange is inserted in gap 26 and then the joint member is rotated to enter it between the two flanges of the channel as the first-mentioned flange leaves the gap. There also is another reason for the gap, as will now be explained.

Joined to each joint member 25 along one edge of its gap is a flat rigid connecting strip 27 that projects laterally across the space between two frames. The strip is disposed substantially radially of the joint member. The connecting strips from adjacent joint members overlap each other, and each strip projects into the opposite joint member through its gap 26. This means that one joint member and connecting strip are inverted relative to the ones beside them. The two strips are held together by a flexible gasket 28 compressed between the outer edge of the outer gap 26 and the outer face of the connecting strip joined to the other joint member. This gasket also seals the gap from the elements. A similar gasket can be mounted in the other gap if desired, but generally it is not needed because it is inside the skylight and therefore protected. Gasket 28 extends around the upper point of the triangular frame it is associated with and back down the opposite side of the frame a few inches. This downwardly extending end portion of the gasket is held in a slot 29 in the adjoining joint member 25. The outer flanges 21 of the channels are provided with longitudinal grooves in their arcuate surfaces, in which sealing gaskets 30 are disposed to prevent water from leaking between the flanges and the joint members. Similar gasket grooves 31 can be formed in the inner flanges 22 if desired.

To prevent the two connecting strips 27 from moving across each other, their adjoining faces are provided with interengaging teeth 32 extending lengthwise of the strips. The teeth permit the connecting strips to be overlapped more or less than shown depending upon the distance between the two joint members, and locked together.

Figure 5:
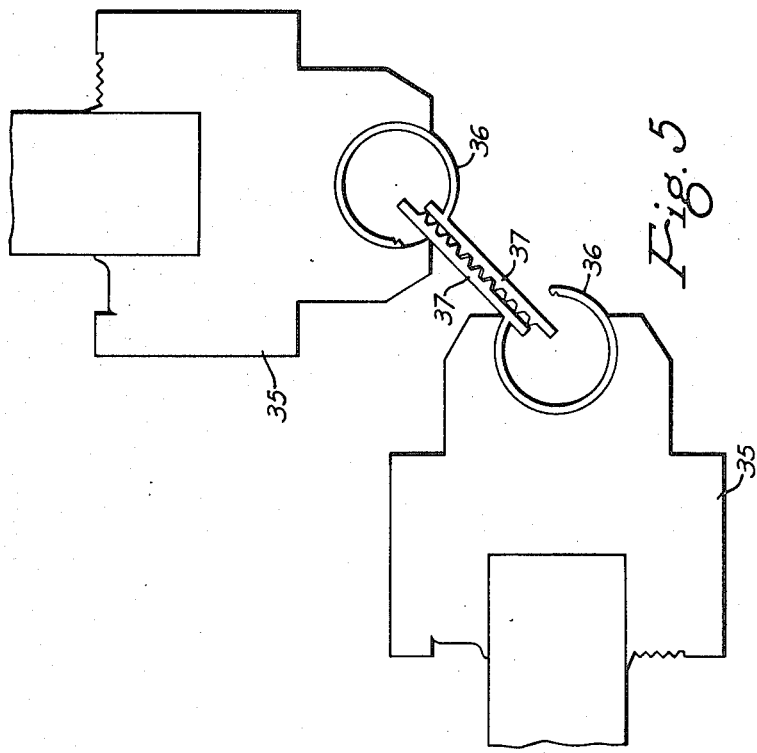
FIG. 5 is a diagrammatic view showing two panel frames disposed at a different angle to each other.

Due to the fact that the joint members can be rotated in the frame channels, or the channels can be turned on the joint members, the frames can be adjusted to various angles to each other, yet the space between them will always be closed by the joint members and connecting strips. This is illustrated diagrammatically in FIG. 5, where two panel frame side members 35 are shown disposed at right angles to each other and adjustably connected by joints members 36 and overlapping connecting strips 37.

At the apex of the pyramid formed by the four frames the space between the upper ends of the frames is closed by a cap, such as a thin flexible plastic disc 39, or strips, engaging the upper surfaces of connecting strips 27 and inserted under the vertices of gaskets 28, between the gaskets and connecting strips 27. This is a simple, but effective, way of sealing the apex of the pyramid.

Figure 1:
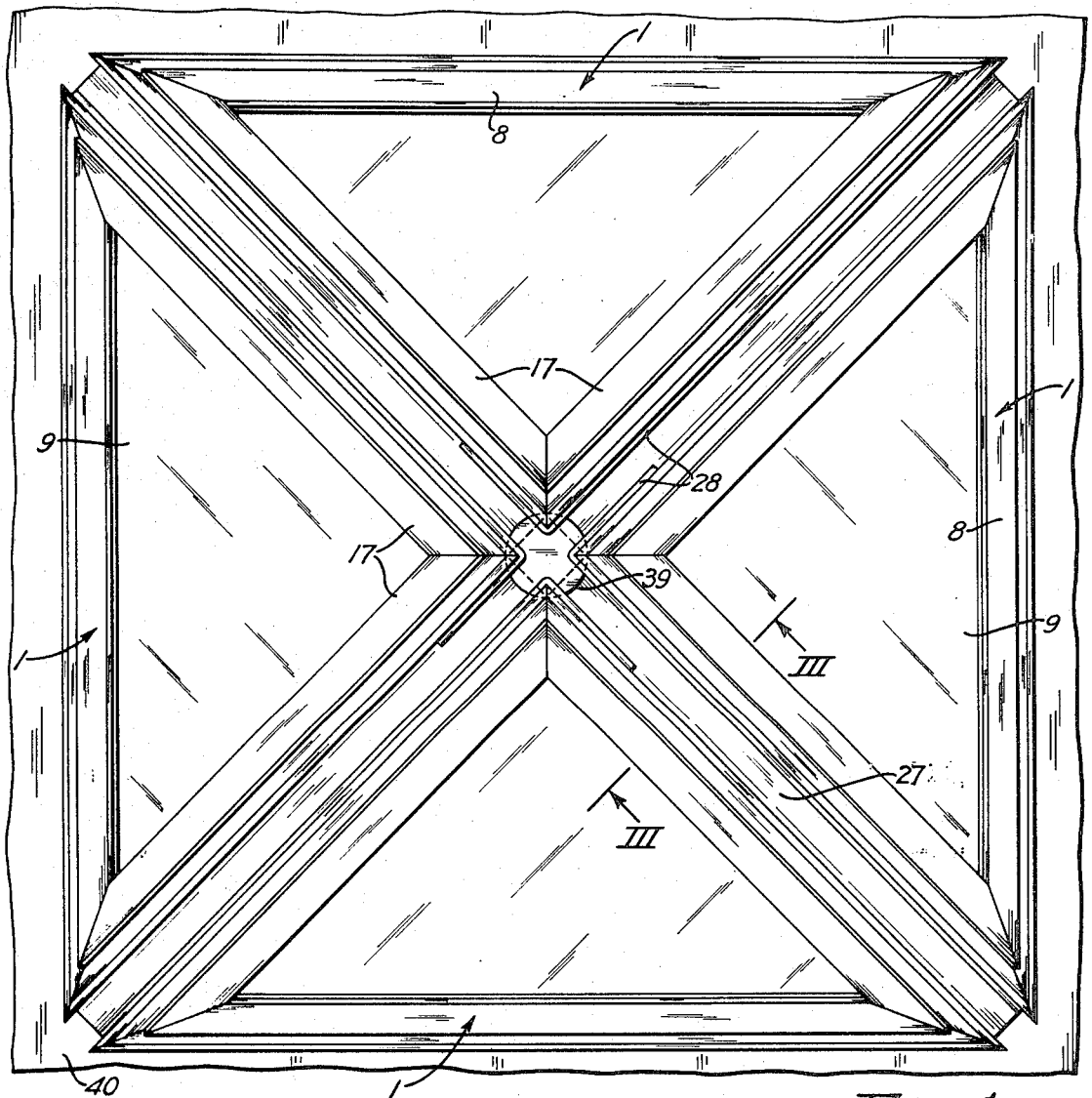
FIG. 1 is a plan view of a skylight constructed from my panel framing.
Figure 2:
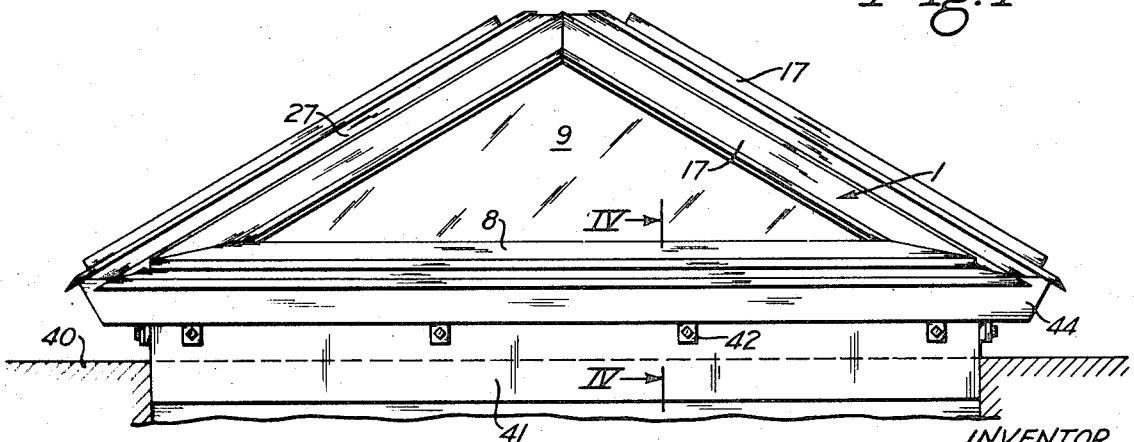
FIG. 2 is a side view thereof.

One way of mounting the skylight over an opening in the roof 40 of a building is shown in FIGS. 2 and 4. The opening is provided with an upstanding frame 41, to which clips 42 are attached by screws 43. The upper ends of the clips are inclined inwardly over the frame and support a sheet metal subframe 44 that extends around frame 41 and down into it. This subframe also extends outwardly from the clips and then is inclined upwardly and outwardly. Flanges 6 of the lower side members 3 of the panel frames rest on the outer edges of subframe 44, and the outer edges of ribs 7 engage the inner inclined surfaces of the subframe.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Panel framing comprising a pair of frames each having a side member provided with an outwardly opening channel having parallel side flanges with transversely arcuate inner surfaces extending lengthwise thereof, said side members being disposed in spaced parallel relation, a tubular joint member extending lengthwise of each channel and rotatably mounted therein in engagement with said arcuate surfaces, each joint member being provided with a gap extending from end to end, a rigid connecting strip extending along each joint member and joined thereto, the strips projecting laterally between said joint members in overlapping relation to close the space between the frames, each connecting strip extending from one edge of the gap in one joint member into the gap in the other joint member, and means holding the strips together and against lateral movement across each other, the angle between said frames being adjustable by rotating at least one of them on the joint member therein.

2. Panel framing according to claim 1, in which said holding means include a gasket compressed between the free edge of one of said gaps and the connecting strip of the other joint member.

3. Panel framing according to claim 1, in which said holding means include interengaging teeth extending lengthwise of the adjoining faces of said strips and also include a gasket compressed between the free edge of one of said gaps and the connecting strip of the other joint member.

4. Panel framing according to claim 6, in which said joint members are cylindrical and have an outer diameter greater than the distance between the outer edges of the side flanges of a said channel, and said gap is wide enough to receive the outer edge of one of said side flanges during assembly of a joint member with a side member.

5. Panel framing comprising at least three triangular frames inclined toward one another and arranged side by side in pyramidal array, a pane of glass in each frame, each frame having at two sides a side member provided with an outwardly opening channel having parallel side flanges with transversely arcuate inner surfaces extending lengthwise thereof, said side members being disposed in spaced parallel relation, a joint member extending lengthwise of each channel and rotatably mounted therein in engagement with said arcuate surfaces, a rigid connecting strip extending along each joint member and joined thereto, the strips projecting laterally between said joint members in overlapping relation to close the space between the frames, there being a pair of said connecting strips between each pair of frames, and means holding the strips together and against lateral movement across each other, the angle between said frames being adjustable by rotating at least one of them on the joint member therein.

6. Panel framing according to claim 5, including a cover member disposed at the apex of said pyramidal array and overlapping the upper ends of all of said strips to seal the apex.

References Cited
UNITED STATES PATENTS

| | | | |
|---|---|---|---|
| 1,294,115 | 2/1919 | Knight | 52—586 |
| 3,066,451 | 12/1962 | Petty | 52—573 |
| 1,379,359 | 5/1921 | Partzschefeld | 52—200 |
| 1,931,750 | 10/1933 | Blaski | 52—395 |
| 2,842,073 | 7/1958 | Huston et al. | 52—395 |
| 3,550,335 | 12/1970 | Huffman | 52—573 |
| 3,139,958 | 7/1964 | De Wilt | 52—82 |
| 3,158,961 | 12/1964 | Hawkins | 52—395 |

FOREIGN PATENTS

| | | | |
|---|---|---|---|
| 3,911 | 3/1887 | Great Britain | 52—200 |
| 1,094,437 | 12/1960 | Germany | 52—399 |

FRANK L. ABBOTT, Primary Examiner

L. A. BRAUN, Assistant Examiner

U.S. Cl. X.R.

52—200, 395, 399, 573